Sept. 22, 1936.  A. HULLEY ET AL  2,055,439
COMBINED SPRING SUSPENSION AND DRIVING MEANS FOR MOTOR VEHICLES
Filed Feb. 5, 1932   2 Sheets-Sheet 1
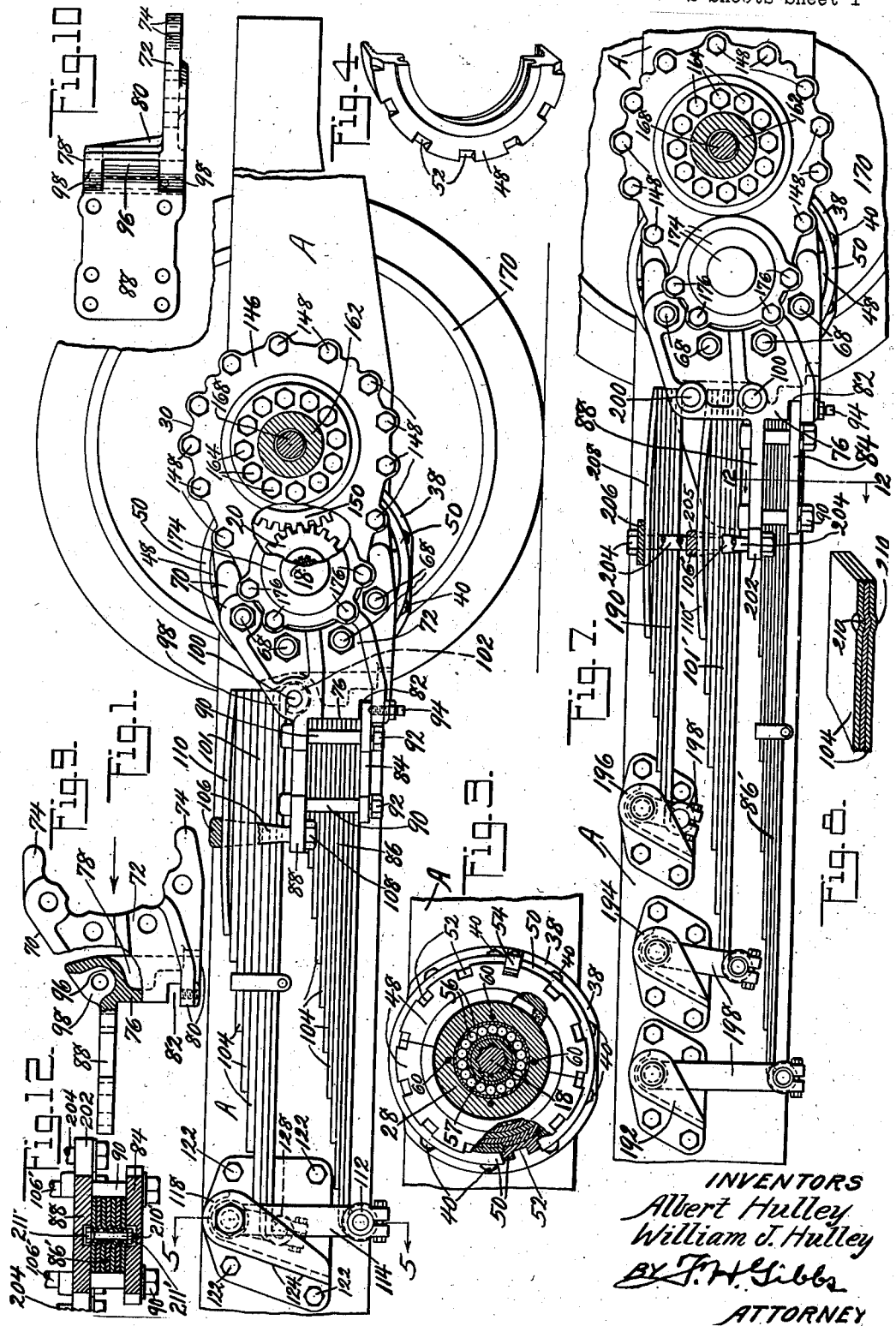
INVENTORS
Albert Hulley
William J. Hulley
BY J. H. Gibbs
ATTORNEY

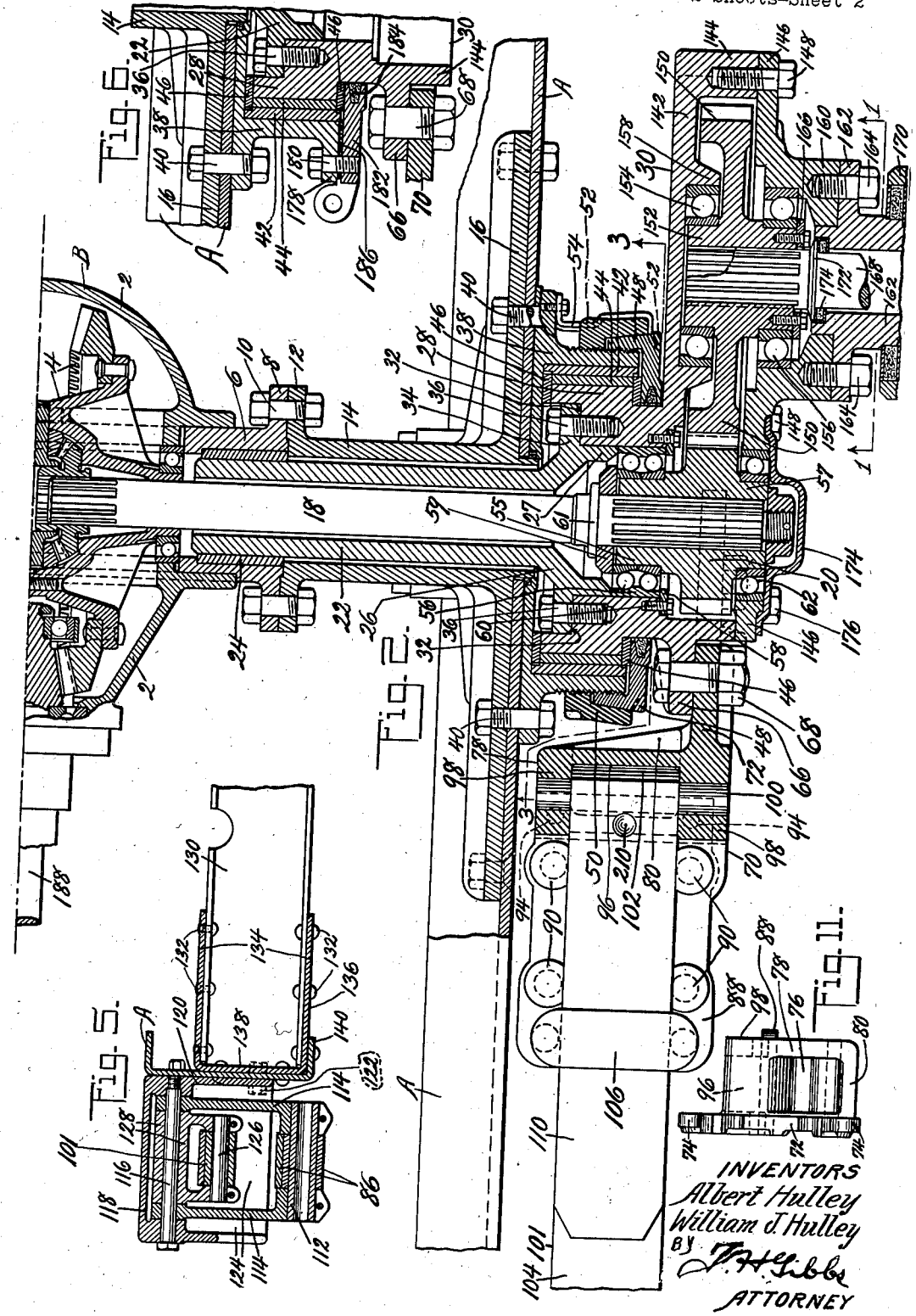

Patented Sept. 22, 1936

2,055,439

UNITED STATES PATENT OFFICE 2,055,439

COMBINED SPRING SUSPENSION AND DRIVING MEANS FOR MOTOR VEHICLES

Albert Hulley and William J. Hulley, New York, N. Y.

Application February 5, 1932, Serial No. 591,046

19 Claims. (Cl. 180—71)

This invention relates generally to motor vehicles and has particular reference to a combined spring suspension and driving means.

One object of this invention is the provision of a spring suspension for motor vehicles which will offer a high degree of resiliency and further provide the necessary firmness and strength to carry the load placed thereupon.

Another object of this invention is the provision of a spring suspension for motor vehicles which is so arranged and constructed as to effect a relatively low center of gravity for the vehicle.

Still another object of the present invention is the provision of means for supporting a motor vehicle at a low elevation, the said supporting means possessing resiliency and having provision for driving the vehicle.

A further object of this invention is the provision of means for supporting the chassis of a motor vehicle which includes a lever mounted for pivotal movement on a horizontal axis relative to the side frame of the vehicle chassis, said lever including a resilient element and a spring beam constituting a gear housing and to which a driving wheel is connected.

Other objects and advantages of this invention will be apparent from the following description taken with the accompaniying drawings in which:

Figure 1 is a side elevation of a portion of a chassis frame having the present invention applied thereto, certain parts being broken away and other parts being shown in section in the direction of the arrows 1—1, Fig. 2.

Fig. 2 is a horizontal sectional view showing the present invention applied to a vehicle chassis.

Fig. 3 is a sectional view on the line 3—3, Fig. 2.

Fig. 4 is a perspective view of one of the segments of the thrust ring.

Fig. 5 is a sectional view on the line 5—5, Fig. 1.

Fig. 6 is a sectional view of a portion of the construction showing a modified form of thrust ring.

Fig. 7 is a side elevation of a portion of a chassis frame showing a modification of the construction illustrated in Figs. 1 and 2.

Fig. 8 is a fragmentary sectional view in perspective showing means for retaining the spring leaves in assembled relation.

Fig. 9 is a side elevation, partly in section, of the spring pad casting.

Fig. 10 is a top plan view of the casting shown in Fig. 9.

Fig. 11 is an end view of the spring pad casting, the view being taken in the direction of the arrow, Fig. 9, and Fig. 12 is a fragmentary sectional view in perspective showing the means for connecting the several spring leaves.

Referring now more particularly to the drawings, the invention is adapted for use with the rear end portion of a vehicle chassis and hence only the rear portion of the chassis is shown, the same comprising spaced channel side frames or side sills A of which only one is shown. B indicates generally a differential housing and comprises the bowl sections 2 which contain the differential gearing 4 and which are supported by a banjo 6, flanged at 8 and secured by suitable fasteners 10 to the flanges 12 of banjo spacers 14, the outer portions of the latter being provided with attaching flanges 16 secured to the side frames A by suitable fasteners. Fig. 2 is taken about the longitudinal center line of the chassis and hence the parts on only one side thereof are shown, it being understood that they are duplicated on the other side of the longitudinal center line.

In connected relation with the differential gearing 4 is a jack shaft 18 which is arranged within the banjo 6 and banjo spacer 14 and projects through the side frame into splined relation with a pinion 20 supported as hereinafter more clearly described. The jack shaft is arranged within a load tube 22, the inner end of which is supported by a bushing 24 in the banjo 6 and the outer end of which is offset as at 26 to provide a circular flange 27 which extends into and nicely fits the inner surface of a hub portion 28 of a spring beam indicated generally at 30, the latter constituting a body portion of a gear housing and also forming a part of a lever, all of which will be apparent from the following description. The spring beam constitutes a wheel mounting device as more fully described hereinafter, said device comprising an independent unit on or connected to the frame.

The hub portion 28 of the spring beam is recessed at its inner end to provide a shoulder 32 to which the load tube 22 is connected by bolts 36 which extend through an annular flange 34 formed with the load tube and resting against the shoulder 32. As clearly shown in Fig. 2, the hub portion 28 is supported for pivotal movement in a side bearing 38 secured to the side frame A by the fasteners 40 which also connect the banjo spacer to said side frame, and to provide necessary flexibility a bushing 42 and a bearing ring 44 are interposed between the hub portion and the inner bearing surface of the side bearing. Arranged in the side bearing on each side of the hub are inner and outer thrust bearings 46, the latter being retained by a thrust ring 48 substantially angle-shaped and threadedly secured to the outer surface of the side bearing 38 and overlapped by a thrust ring locking element 50 also threadedly secured to the side bearing 38. As clearly shown in Figs. 3 and 4, the thrust ring 48 is preferably formed of a pair of segments while the thrust ring locking element 50 is a unitary annulus. The thrust ring and locking element are each provided with notches 52 which are adapted to aline to receive a resilient key 54 secured to the side bearing to retain the said thrust ring and locking element in adjusted position.

Arranged within the hub portion 28 is a ball bearing assembly 56, the outer race of which is retained against displacement by being interposed between the offset flange 27 of the load tube and a retainer ring 58 connected to the hub 28 by suitable fasteners 60. This bearing assembly 56 provides partial support for the pinion 20 and, as shown in Fig. 2, the latter is formed with a hub which, in effect, comprises oppositely extending bearing portions 55 and 57 each provided with an annular recess, the inner race of bearing assembly 56 fitting the recess in bearing portion 55 and being overlapped by a collar 59 arranged on the jack shaft 18 and interposed between the said bearing portion and integral flange 61 on the jack shaft. Obviously the arrangement just described prevents accidental movement of the inner race relative to the bearing portion. The recess in the bearing portion 57 receives the inner race of a ball bearing assembly 62 supported by a spring beam cap as hereinafter more fully described.

The hub portion 28 of the spring beam is provided with an integral attaching flange 66 (see Fig. 2) to which is bolted as at 68 a spring pad indicated generally at 70. As clearly shown in Figs. 9, 10, and 11, the spring pad preferably comprises a forked body portion 72 constituting the attaching portion for the casting and having oppositely arranged vertically alined arms 74. The opposite end of the body portion 72 is provided with an end wall 76 which extends at substantially right angles to the body portion 72 and the free edge of which is provided with a stiffening flange 78 parallel to the body portion and which, at its lower end, is integral with a horizontal shelf or web 80 formed with the body portion 72 and wall 76 as more clearly shown in Fig. 11. Adjacent the web 80 the end wall 76 is inset to provide a transversely arranged recess 82 into which one end portion of a bottom spring plate 84 extends to be supported by said web 80, as clearly shown in Fig. 1, the plate 84 underlying a low spring assembly 86, the end portions of which latter abut the end wall 76. The spring assembly 86 is clamped between said plate 84 and an upper spring plate 88 projecting from the end wall 76 parallel with the plate 84 and receiving clamping bolts 90 which pass through plate 84 and are secured by the nuts 92. To prevent displacement of plate 84 set screws 94 pass through the lower portion of the body portion 72 of the spring pad to engagement with the lower spring plate 84.

Adjacent its upper end and adjacent the plate 88 the end wall is bent inwardly and then upwardly to provide a transversely arranged pocket 96 between the body portion 72 and the vertical flange 78, said body portion and flange being provided with apertured lugs 98 at the ends of the pocket 96 which journal a pin 100 in the pocket 96 about which the lowermost leaf of an upper spring assembly 101 is coiled, as shown at 102.

The spring assemblies 86 and 101 are each formed of a plurality of flat leaves 104, and assembly 101 is operatively connected to assembly 86 by a spring clip 106 in bolted connection as at 108 with the upper spring plate 88, the spring clip extending over an arched spring leaf 110 forming the uppermost leaf of assembly 101.

From the above description it will be apparent that spring assemblies 86 and 101 are each supported at one end portion by the spring pad 70. The said assemblies are substantially identical and of the same length and the opposite ends thereof are connected as now to be described. Referring to Figs. 1 and 5 it can be seen that the opposite end portion of the spring assembly 86 is connected to a shackle bolt 112 supported by links 114 pivotally suspended from a bolt 116 supported in the upper portion of a shackle housing 118 having an attaching base 120 by which said housing is secured to the side frame A by fasteners 122. As clearly shown in Fig. 1, the housing is provided with a rear wall 124 which is inclined downwardly to provide necessary clearance for the links 114 during their swinging movement.

The upper spring assembly 101 is also connected to the side frame A, the assembly being connected to a shackle bolt 126 (see Fig. 5) journaled in an inverted U-shaped hanger 128 suspended from the bolt 116 arranged between the links 114, the hanger 128 thus serving as a spacer for the links 114. Fig. 5 also discloses a part of the chassis construction in which a channel cross member 130 which extends between the opposite side frames A is riveted at 132 to the vertically alined arms 134 of a horizontally arranged U-shaped connector 136 attached at its web or cross-arm 138 to the inner surface of the side frame A, the latter being a channel and the connector 136 being supported by and connected to the lower flange 140.

From the description so far, it will be obvious to those skilled in the art that the present construction includes a lever, one portion of which, namely, the spring assembly 86, is resilient and the other portion of which is rigid. The lever comprises the spring assembly 86, the spring pad 70 and the spring beam 30, and said lever is provided with a hub portion 28 in the side bearing 38, the latter constituting the fulcrum for the lever.

The spring beam 30 constitutes a gear housing and includes a body portion 142 formed with the hub 28, in one portion of which the pinion 20 is arranged as heretofore described; the body portion having a marginal flange 144 which projects outwardly relative to the chassis and to which a cap 146 is secured by fasteners 148. As will be apparent from Figs. 1 and 2, the arms 74 of the body portion 72 of the spring pad fit around a portion of the marginal flange 144. Arranged within the housing, in mesh with pinion 20, is a gear 150 having a hub 152 supported in inner and outer ball bearing assemblies 154 and 156 respectively, assembly 154 being supported by an annular flange 158 formed on the inner surface of the body portion, while bearing assembly 156 is supported by the cap 146 adjacent an opening in the latter which is surrounded by an attaching flange 160 to which an axle tube 162 is secured by bolts 164. Bearing assembly 156 is secured against displacement by a retainer ring 166 secured to said hub as clearly shown in Fig. 2.

In splined connection with the hub 152 of gear 150 is a stub axle 168 for driving the traction wheel 170, the axle extending through the axle tube 162 and having a collar 172 thereon adjacent the splines which engages against a packing 174 arranged in a recess at the inner end portion of the axle tube.

Adjacent the pinion 20 the cap 146 is provided with an opening in which the outer bearing assembly 62 which embraces the hub of the pinion 20 is mounted and said opening is closed by a cover plate 174 bolted or otherwise secured to the cap 146 as at 176.

Fig. 6 discloses a modified form of adjusting means for the gear housing and as shown therein the marginal portion of the side bearing 38 is substantially channel-shaped in section to provide an outer flange 178 to which is secured by suitable fasteners 180 a split ring member 182, the inner edge of which is recessed to receive suitable packing 184 and said inner portion underlies the adjacent thrust ring 46. Interposed between the thrust ring and the flange 178 is a shim 186. The position of the split ring member 182 may be adjusted relative to the flange 178 and hence relative to the thrust ring 46 by any suitable number of shims as desired.

A drive shaft 188 is shown for operating the differential gearing 4 and upon operation of the latter it will be seen that the jack shaft 18 will be rotated to turn the pinion 20 and thus rotate the gear 150 which latter, in turn, will cause rotation of the axle 168 and effect a consequent rotation or actuation of the traction wheel 170. It is to be noted that the gear housing 30 is completely closed and that suitable lubricant may be retained therein and within the load tube and banjo spacers and in the differential housing B; all moving parts of the construction illustrated in Fig. 2 thus being properly and effectually lubricated. It is also to be noted that suitable adjustments are provided for the gear housing relative to the side bearing 38 due to the thrust ring, thrust lock and key shown in Fig. 2 or by the retaining ring 182 shown in Fig. 6. It is likewise to be noted that the gears 20 and 150 are rotatably mounted in the housing and the entire assembly as a self-contained transmission element may be handled as a unit without disturbing any of the drive adjustments and that the gear bearing supports are independent of any drive shaft or axle support. Due to the fact that the jack shaft passes through the side frame A it is obvious that the chassis is mounted at a relatively low elevation which will permit easy and quick loading and unloading of the vehicle.

In starting the vehicle, operation of drive shaft 188 to turn the jack shaft 18 and its associated pinion 20 will tend to cause a pivotal movement of the lever hereinbefore described on its fulcrum, the side bearing 38, due to the load. The lever, as before mentioned, comprises a construction in which part thereof is resilient and the other part rigid. This lever is pivoted at its rigid portion, namely, the spring beam 30, and it will be apparent that when the pinion 20 commences to rotate such movement will tend to cause the spring beam 30 to rotate on its fulcrum, the side bearing 38, and, as a matter of fact, a partial rotation or pivotal movement of this spring beam will take place until the spring assemblies counteract the action; the action being a movement of the lever hereinbefore mentioned. As the lever is connected at its resilient end to the side frame, it will be apparent that while this connection will hinder pivotal movement of the lever yet pivotal movement is permitted because of the resiliency of the spring assembly.

Fig. 1 discloses two assemblies, one above the other, and the lower spring assembly 86 may be termed the light load spring and is adapted to take normal loads while the upper spring assembly 101 is the heavy load spring and cooperates with the spring assembly 86 upon increase of load on the vehicle beyond the predetermined limit of assembly 86. As mentioned before, the leaves of the respective spring assemblies 86 and 101 are flat but spring assembly 101, in the instance shown, is provided with an upper leaf of arched form and when load is imposed on the vehicle to be resisted by the lower spring assembly 86, downward movement of the spring assembly 86 will cause the spring clip 106 to act against the arched leaf 110 to tend to flatten the latter. Between the uppermost flat leaf of spring assembly 101 and the arched leaf 110 is a clearance due to the arching of leaf 110 and should the load imposed upon spring assembly 86 be sufficient to flatten the leaf 110 into contact with the remainder of the assembly 101, the latter will then function as a unit in cooperation with the spring assembly 86. Due to the identity of the assemblies 86 and 101 it will be obvious that simultaneous functioning of the assemblies is uniform both as to periodicity of resilience and action, the two assemblies therefore functioning as a unit when the load imposed on assembly 86 exceeds a predetermined degree. The spring clip 106 has provision for adjustment relative to the upper spring assembly whereby the effective operation thereof, or more specifically, the effective operation thereof relative to the lower spring assembly 86 may be varied to suit desired conditions. Obviously more or less clearance may be provided between the arched leaf 110 and the upper flat leaf of spring assembly 101 by suitable adjustment of the securing nuts 108 whereby to cause said upper spring assembly to function relative to the spring assembly 86 at any predetermined time. The upper spring assembly 101 is shown as provided with a single arched leaf but obviously, within the scope of the present invention, a plurality of arched leaves may be provided.

Fig. 7 discloses a modification of the construction shown in Fig. 1 and is designed for the purpose of accommodating extremely heavy loads to which a vehicle may be subjected, for example, loads in excess of those which may be satisfactorily supported by the spring construction shown in Fig. 1. The form in Fig. 7 contemplates the provision of a plurality of spring assemblies adapted to be brought into effective operation sequentially upon increase of load on the vehicle. In the instance shown, three spring assemblies are shown, the lowermost being indicated at 86' and corresponding in function to the assembly 86 of Fig. 1 and comprising the light load spring. The intermediate spring assembly is designated at 101' while the uppermost spring assembly is shown at 190. In this form of the invention the several spring assemblies are of different lengths and have one end thereof connected to the side frame A through independent shackle housings 192, 194, and 196 respectively by links 198, assembly 86' being greater in length than the assemblies 101' or 190, while the uppermost spring assembly 190 is of less length than either of the other two. If desired, the several assemblies may be formed of individual spring leaves of different proportions and hence of different resiliency; in the instance shown the assembly 86' is formed of relatively thin leaves, while the respective leaves of the remaining assemblies are of a form differing from that of the assembly 86'. The modification in Fig. 7 necessitates a modification of the spring pad and, as shown clearly in this figure, the end wall 76 of the casting is extended upwardly beyond the pocket 96 of Fig. 9 and said pocket structure 96 and the bearings are duplicated to support an upper pin 200 to which the lower leaf of the uppermost spring assembly 190 is connected and by which said uppermost spring assembly is supported. The spring assemblies 101' and 190 are connected together for sequential effective operation upon increase of load to the spring assembly 86'. As shown clearly in Fig. 7, a spring clip 106' is shown which is substantially of H shape having the legs 204 connected by a cross bar 205 intermediate their ends, which bar 205 is interposed between the assembly 101' and the uppermost assembly 190, the cross bar 205 contacting with the arched spring leaf 110' and the lower ends of the legs 204 of the spring clip being connected by suitable fasteners to the lugs 202 of the plate 88. The uppermost spring assembly 190 is retained between the upper ends of the legs 204 of the spring clip which is provided with a top plate 206 secured against an arched spring leaf 208 by means of suitable nuts. The arched leaf 208 obviously provides a clearance between the uppermost flat leaf of the spring assembly 190, which clearance may be varied to suit desired requirements by an adjustment of the nuts whereby the uppermost spring assembly 190 is adapted for effective operation to suit desired conditions. It is apparent that the several spring assemblies shown in Fig. 7 may be relatively so adjusted as to function sequentially in response to predetermined loads. It will be apparent to those skilled in the art that the spring assemblies 101' and 190 are preferably not brought into active service in resisting a load at one and the same time. In the instance shown in the drawings a greater clearance is provided between arched leaf 208 and the uppermost flat leaf of assembly 190 than is present between the arched leaf 110' and the uppermost flat leaf of assembly 101' whereby extremely heavy loads are resisted first by the lowermost spring assembly 86 and then spring assemblies are sequentially brought into effective operation.

Fig. 8 discloses a method of connecting the several leaves of the spring assemblies to restrain the same against relative horizontal shifting, the leaves being interfitted each with the other through projections 210 formed in the leaves which interfit into the depressions of adjacent leaves. In addition, Fig. 12 discloses further means of connecting the leaves against horizontal shifting in which a suitable fastener such as a bolt 210' extends through the several leaves and preferably at the interfitted projections thereof. In the instance shown, Fig. 12 is taken on the line 12—12, Fig. 7, and the plates 84 and 88 are recessed to receive the head and securing nut 211' for the bolt 210'.

In the usual type of vehicle the wheel axle is connected with a spring mounted either above or below the axle and it is obvious that upon side sway of the vehicle the springs of such a suspension are subjected to great torsional stresses. In the present construction a lever is provided which is formed in part of a rigid element and in part of a resilient element connected to the side frame, and said lever is arranged immediately adjacent and parallel with the side frame; in other words, the spring assemblies, the jack shaft, the pinion 20, the gear 150 and the wheel axle 168 are all in substantially the same horizontal plane with the side frame A and due to this arrangement it will be apparent that the spring assemblies are relieved of the greater amount of torsional strains and stresses incident to side sway of the vehicle.

The drawings are for illustrative purposes only and it is to be understood that various changes in the form and proportions of the construction may be made within the scope of the appended claims without departing from the spirit of the invention.

What is claimed is:

1. A spring suspension for the rear end portion of a motor vehicle comprising a lever pivoted intermediate its ends to the chassis side frame and formed of a resilient member connected to said side frame at one end and a rigid member connected to the other end of the resilient member, said rigid member constituting a gear housing, said housing being provided with portions to rotatably support a plurality of gears therein.

2. A spring suspension for the rear end portion of a motor vehicle comprising a lever having one portion thereof rigid and the other portion resilient, said resilient portion being connected at its free end to the vehicle side frame, means pivotally connecting said lever at its rigid portion to said side frame, a stub axle carried by the rigid portion of the lever adjacent its free end, a plurality of gears rotatably supported by the rigid portion for driving said axle.

3. In a vehicle, a side frame, a lever pivoted intermediate its ends to the side frame and including a rigid portion and a resilient portion connected to the side frame at its free end, a wheel axle supported by the rigid portion of the lever and arranged eccentric with relation to the pivotal axis of said lever, said rigid portion being formed to provide a gear housing, gearing rotatably supported in the housing for driving the axle, and means arranged at the pivotal axis of the lever for driving said gearing.

4. A combined spring suspension and driving means for motor vehicles comprising a lever pivotally connected intermediate its ends to the chassis side frame and including a resilient portion connected to the side frame and a rigid portion, an axle carried by the rigid portion, gearing for driving the axle journaled in the rigid portion of the lever, and means for driving said gearing.

5. In a spring suspension for motor vehicles, a lever formed of a resilient member and a gear housing connected thereto, means surrounding a portion of the gear housing and pivotally connecting the gear housing to the vehicle chassis side frame, shackle means connecting the resilient member to the side frame whereby pivotal movement of the lever is resisted, an axle carried by the gear housing, and driven gearing supported in the housing for driving the axle.

6. In a motor vehicle, a combined spring suspension and driving means comprising a lever formed of independent, connected rigid and resilient members respectively, said rigid member being so formed as to provide a gear housing, shackle means connecting the resilient member to the vehicle chassis side frame, a driven axle carried by the rigid member, an axle housing, means on the side frame independent of the axle housing to which the lever is pivotally connected intermediate the ends of the rigid member, and gearing in said gear housing for driving the axle, one of the elements of said gearing being arranged substantially at the pivotal axis of the lever.

7. In a motor vehicle, a spring suspension comprising a lever pivotally connected to the chassis side frame and formed of a rigid member for supporting an axle on one side of the pivotal axis, and a resilient member on the opposite side of said axis, axle driving means carried by said rigid member, shackle means connecting the resilient member to the side frame independent of the axle housing whereby pivotal movement of the lever is resisted, and spring means supported at one end by the lever and connected to the side frame, said spring means being cooperatively connected with the lever for effective operation upon pivotal movement of said lever beyond a predetermined degree.

8. A spring suspension for motor vehicles comprising a lever pivotally connected to the vehicle side frame and formed of a resilient member connected to the side frame and a rigid element so formed as to constitute a gear housing, and spring means connected to the side frame and cooperatively connected with said lever for effective operation upon pivotal movement of the latter beyond a predetermined degree.

9. In a spring suspension for motor vehicles, a lever pivoted intermediate its ends to the vehicle chassis side frame and formed of a rigid element constituting a gear housing and a resilient member, means connecting the resilient member and chassis side frame to permit but to resist pivotal movement of the lever, and spring means connected to said side frame and connected with the resilient member and adapted for effective operation upon pivotal movement of the lever beyond a predetermined degree.

10. Spring suspension means for motor vehicles comprising a lever formed of a gear housing element, a spring pad connected to said gear housing element, a spring assembly connected with said spring pad, and a second spring assembly arranged in a horizontal plane above said first-named spring assembly and connected to the latter for effective operation thereby upon the application to said first-named spring member of load in excess of a predetermined degree.

11. In a motor vehicle, a side frame, a side bearing secured thereto, a lever having a hub portion pivotally mounted within said bearing and including a resilient portion on one side of the pivotal axis connected to the side frame, said lever also including a gear housing, a pinion in the gear housing at substantially the pivotal axis of the lever, a gear in the housing meshing with the pinion, a wheel axle to be driven by said gear and arranged eccentric relative to the pivotal axis of the lever, and a driving element extending through the side frame into the pinion for actuating the latter.

12. In a motor vehicle, a side frame, an annular fulcrum element secured to the side frame, a spring beam journaled for pivotal movement in said annular fulcrum element and having a portion thereof formed to constitute a gear housing, gearing in said gear housing, a wheel axle adapted to be driven by said gearing and projecting from the spring beam, a jack shaft for driving the gearing arranged substantially at the pivotal axis of the spring beam, and resilient means connected to the spring beam and side frame adapted to resist but permit pivotal movement of said spring beam.

13. A spring suspension for motor vehicles comprising a wheel supporting lever pivotally connected to the vehicle frame and having a resilient portion connected to the frame at a point remote from the pivot mounting, wheel driving means carried by said lever, and spring means connected to said lever and to said frame, said resilient portion of the lever and said spring means being so connected as to act sequentially upon increase of load on the vehicle and at substantially the same periodicity of resilience.

14. A spring suspension for motor vehicles comprising a lever pivotally connected to the chassis side frame and formed of a rigid member for supporting an axle on one side of the vertical plane coincident with the pivotal axis and a light load spring on the opposite side of said axis connected to the side frame, said rigid member being so formed as to constitute a gear housing, axle driving means carried by said rigid member, and a heavy load spring connected to the side frame and to the light load spring, said springs being so connected as to be adapted for effective operation sequentially upon increase of load on the vehicle.

15. In a spring suspension for motor vehicles, a jack shaft, a housing for the jack shaft secured to the chassis of the vehicle, a load tube within the housing surrounding the jack shaft for the greater part of its length, and a wheel supporting lever secured to the load tube and formed of a rigid element and a resilient member, said resilient members cooperating with the chassis to support the chassis and said rigid element being so formed as to constitute a gear housing.

16. In a motor vehicle comprising a chassis having side frame members and a differential gearing and a banjo enclosing said gearing, a spring suspension for the vehicle comprising a jack shaft, a load tube surrounding the jack shaft and extending from adjacent the banjo outwardly beyond a side frame member, means supporting the load tube so formed as to permit rotative oscillation thereof relative to the jack shaft, and a wheel supporting lever secured to the load tube and formed of a rigid element and a resilient member, said rigid element constituting a gear housing, and means connecting the resilient member to the side frame member.

17. A wheel mounting comprising a frame, a jack shaft, a load tube arranged transversely of the frame and projecting therebeyond, said load tube enclosing the jack shaft for the greater part of the length thereof, a lever secured to the load tube and formed of a resilient member secured to the frame and a rigid element, a bearing secured to the frame in which said rigid element is journaled, a wheel supported by the rigid element, and means actuated by the jack shaft for driving the wheel.

18. A suspension for the rear end portion of a motor vehicle comprising a lever pivoted intermediate its ends to the chassis side frame and formed of a resilient member connected to the side frame at one end and a rigid member connected to the other end of the resilient member, said rigid member being so formed as to constitute a gear housing, gearing in said housing, a jack shaft for actuating said gearing, and a load tube surrounding the jack shaft for the greater part of the length thereof and connected to said rigid member.

19. A spring suspension for motor vehicles comprising a lever having one portion thereof rigid and the other portion resilient, means connecting the free end of the resilient portion of said lever to the vehicle frame, a jack shaft, means pivotally connecting said lever at its rigid portion to the vehicle side frame, a wheel supporting axle carried by the rigid portion of the lever, a wheel on said axle, gearing supported by the rigid portion of the lever for driving said axle, and a movably mounted load tube surrounding the jack shaft and extended through the vehicle side frame and fixedly connected to the rigid portion of the lever.

ALBERT HULLEY.
WILLIAM J. HULLEY.